United States Patent [19]

Dear et al.

[11] Patent Number: 5,209,259
[45] Date of Patent: May 11, 1993

[54] FLUID DISTRIBUTION SYSTEM HAVING NOISE REDUCTION MECHANISM

[75] Inventors: Terrence A. Dear, Elkton, Md.; Karl U. Ingard, Kittery Point, Me.

[73] Assignee: E. I. Du Pont de Nemours and Company, Wilmington, Del.

[21] Appl. No.: 641,402

[22] Filed: Jan. 15, 1991

[51] Int. Cl.$^5$ .................... F16K 47/00; F16K 47/08
[52] U.S. Cl. ..................... 137/561 A; 137/625.38; 251/127
[58] Field of Search ............ 137/625.38, 625.37, 137/561 A, 625.3; 251/127

[56] References Cited

U.S. PATENT DOCUMENTS

| | | | |
|---|---|---|---|
| 3,605,787 | 9/1971 | Krogfoss et al. | 137/625.38 X |
| 3,665,965 | 5/1972 | Baumann | 138/42 |
| 3,776,278 | 12/1973 | Allen | 137/625.38 |
| 3,813,079 | 5/1974 | Baumann et al. | 251/127 |
| 3,954,124 | 5/1976 | Self | 138/42 |
| 4,108,210 | 8/1978 | Luthe et al. | 137/625.37 X |
| 4,149,563 | 4/1979 | Seger | 137/625.37 X |
| 4,180,100 | 12/1979 | Kolb et al. | 137/625.3 |
| 4,249,574 | 2/1981 | Schnall et al. | 137/625.37 X |
| 4,384,592 | 5/1983 | Ng | 137/625.37 |
| 4,429,714 | 2/1984 | Hughes et al. | 137/625.3 |
| 4,479,509 | 10/1984 | Dear et al. | 137/560 |
| 4,860,993 | 8/1989 | Goode | 251/127 |
| 4,892,118 | 1/1990 | Davis et al. | 137/625.3 |

*Primary Examiner*—John Rivell

[57] ABSTRACT

A fluid distribution system, such as a valve, comprises a housing having a chamber which has a plurality of acoustic modes. The acoustic modes are excited when fluid flows through the chamber. An inlet passage and an outlet passage are disposed in fluid communication with the chamber. A plate is disposed in the inlet passage. A plurality of orifices are formed in the plate. The orifices conduct fluid from the inlet passage to the chamber and reduce the coupling between the flow of fluid through the inlet passage and the acoustic modes of the chamber. With this arrangement, the acoustic modes of the chamber and the resonance frequency of each of the orifices are substantially unexcited by the flow of fluid through the orifices.

18 Claims, 8 Drawing Sheets

FLUID DISTRIBUTION SYSTEM HAVING NOISE REDUCTION MECHANISM

BACKGROUND OF THE INVENTION

1. Field of the Invention

The present invention relates to a fluid distribution system, and in particular a valve, which reduces the noise generated by a fluid flowing therethrough.

2. Description of the Related Art

When reducing the pressure of a fluid in a system, noise may typically be generated by a fluid distribution system, such as a valve. Depending upon the environment in which the valve is used, the generation of such noise may be harmful to those persons exposed to it in terms of possible damage to their hearing. The Occupational Safety and Health Administration (OSHA) has set the standard for the basic permissible noise intensity to which a person may be exposed for a duration of eight hours a day at 90 dBA. In addition, noise can have an adverse effect such as structural fatigue and/or equipment malfunction in the system in which the valve is utilized. Thus, in industrial applications, noise generation from pressure reduction is clearly undesirable.

Valves are a major source of industrial noise pollution due to the fact that they conduct fluids through orifices which restrict the flow thereof and cause unstable separation of flow. Noise can be classified as two types—broad band and narrow band, the latter including pure tones. Unacceptable noise levels in valves usually occur when pure tone excitation (whistle or screech) is involved. Whistle or screech is caused by the unstable separation of flow over a sharp edge or in the wake of a blunt body and coupling between this flow and acoustic modes within the surrounding cavities and pipe. This unstable flow separation, when stimulated by the acoustic modes of the chamber, can result in high intensity feedback oscillations and related emission of sound.

Reducing the noise generated by the fluid flowing through a valve has been accomplished by a variety of devices. In cage trim valves, in which a cage trim guides a valving element in its travel relative to a valve seat, the trim configuration has been a focus of noise-reducing efforts. The typical modification to the trim restricts the fluid flow rate through the trim, which reduces noise. The prior art shows many such modifications, for example, U.S. Pat. No. 3,954,124 to Self, which discloses nested concentric sleeves for subdividing the flow of fluid through a fluid control valve into a plurality of streams between the valve inlet and outlet. U.S. Pat. No. 4,384,592 to Ng discloses a cylindrical valve trim which has holes in the valve trim wall that pass through the wall at predetermined angles to create a plurality of counter-rotating vortices.

U.S. Pat. No. 4,860,993 to Goode incorporates a cage design using axially spaced sets of ports interconnected by plenums to direct multiple flow streams through a series of changes of direction to reduce the velocity and pressure of the fluid. U.S. Pat. No. 3,776,278 to Allen discloses a control valve including a perforated sleeve-like cage member, where fluid flow is directed through the perforations to partition the flow, thereby attenuating noise.

These devices of the prior art deal with reducing broad band noise generated at the outlet of the device. None of the devices of the prior art have dealt with the problem of reducing narrow band or pure tone noise generated at the inlet. In fact, in some cases, these devices may generate undesirable pure tones in the range of human hearing.

Moreover, these devices tend to become clogged by particulate matter entrained in the fluid because they incorporate a circuitous path design. For this reason, they are difficult to manufacture and maintain. Thus, the known prior art approaches to reducing valve noise increase the cost of manufacturing and maintenance and decrease the reliability of valves, while increasing the potential for valve failure.

Accordingly, it is an object of the present invention to provide an approach for eliminating narrow band or pure tone noise in a fluid distribution system, and specifically in a valve.

It is also an object of the present invention to provide a plate for a fluid distribution system and a sleeve for a valve which reduce the noise produced by fluid flowing through the system or the valve.

Yet another object of the present invention is to provide a fluid distribution system and a valve which incorporate a simple, straight flow path and which are thus easy and inexpensive to manufacture and maintain.

A further object of the present invention is to provide a sleeve which can be installed in existing valves with a minimum of disruption.

Another object of the present invention is to design a valve which reduces the noise produced by fluid flowing therethrough.

It is intended that the fluid distribution system of the present invention includes a variety of devices, such as valves, dryers, fluid impingement devices and flow restrictors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects and in accordance with the purposes of the invention as embodied and broadly described herein, there is provided a fluid distribution system for conducting a fluid therethrough, where the fluid has oscillations carried therein. The fluid distribution system comprises a housing including at least one chamber, the chamber having a plurality of acoustic modes, where the acoustic modes are excited when the fluid flows through the chamber. An inlet passage and an outlet passage are disposed in the housing and are in fluid communication with the chamber. The fluid distribution system further comprises a mechanism for eliminating narrow band noise. The mechanism for eliminating narrow band noise comprises a plurality of orifices disposed in the inlet passage for reducing the coupling between the flow of fluid through the inlet passage and the acoustic modes of the chamber. Each of the orifices has a resonance frequency. With this arrangement, the acoustic modes of the chamber and the resonance frequency of each of the orifices are substantially unexcited by the flow of fluid through the orifices.

It is further preferable that the mechanism for eliminating narrow band noise comprises a plate disposed in the inlet passage, wherein the orifices are formed in the plate.

In the preferred embodiment, the fluid flow control device comprises a valve having a sleeve surrounding the inlet passage, wherein the orifices are formed in the sleeve.

Further in accordance with the present invention, there is provided a valve having a plurality of inlet passage openings disposed in the valve body for reducing the coupling between the flow of fluid through the inlet passage and the acoustic modes of the valve chamber. Each of the inlet passage openings has a resonance frequency. With this arrangement, the acoustic modes of the chamber and the resonance frequency of each of the orifices are substantially unexcited by the flow of fluid through the inlet passage openings.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explain the principles of the invention.

DESCRIPTION OF THE PREFERRED EMBODIMENTS

Reference will now be made in detail to the present preferred embodiments of the invention as illustrated in the accompanying drawings.

Figure 1:
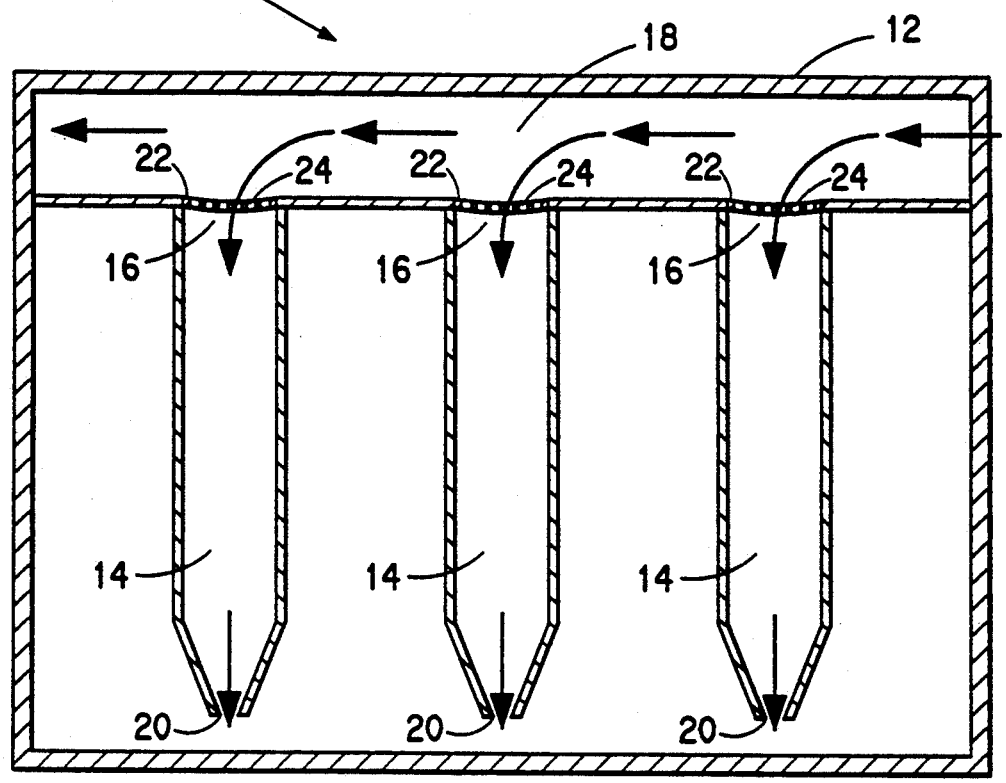
FIG. 1 is a cross-sectional view of a first embodiment of the fluid distribution system of the present invention.

In accordance with the present invention there is provided a fluid distribution system for conducting fluid therethrough. Such a system is shown generally at 10 in FIG. 1. System 10 comprises a housing 12 including at least one chamber 14. Three chambers 14 are shown in the system of FIG. 1. Each chamber 14 has a plurality of cavities formed therein and thus a plurality of acoustic modes. The acoustic modes are excited when the fluid flows through the chamber.

The fluid distribution system of the present invention also comprises an inlet passage and an outlet passage disposed in the housing and in fluid communication with the chamber. Three inlet passages 16 are shown in FIG. 1 disposed in housing 12, and each is in fluid communication with a respective chamber 14. As shown in FIG. 1, each inlet passage 16 communicates with an inlet port 18. As also shown in FIG. 1, three outlet passages 20 are disposed in housing 12. Each outlet passage 20 is in fluid communication with chamber 14 so that fluid flows from inlet port 18, to each inlet passage 16, through each respective chamber 14 and out through each respective outlet passage 20.

Figure 3:
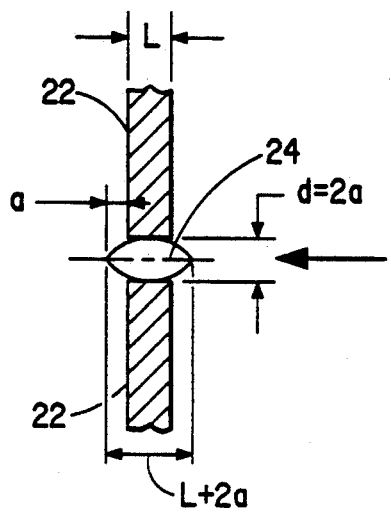
FIG. 3 is a cross-sectional view of the plate and the orifices according to the first embodiment of the present invention.

As embodied herein, the fluid distribution system of the present invention comprises means for eliminating narrow band noise. The means for eliminating narrow band noise comprises a plate and a plurality of orifices disposed in the inlet passage. As shown in FIG. 1, a plate 22 is disposed in each inlet passage 16. Plate 22 is disposed exactly at the location where the fluid accelerates through inlet passages 16 and into chambers 14. A plurality of orifices 24 are disposed in each inlet passage 16 and are formed in each plate 22. Plate 22 and one orifice 24 are shown in cross-section in FIG. 3. Each orifice 24 has a resonance frequency. Assuming that the dimensions of each of the orifices are the same, the resonance frequencies of the orifices are equal. As shown in FIG. 3, each orifice 24 has a length, L, a diameter, d, and an end correction a, where $d=2a$, and the total length of the orifice, with end corrections taken into account, is $L+2a$. The orifice, with end corrections, behaves like an organ pipe. Orifices 24 conduct fluid from inlet port 18, through inlet passages 16, to each respective chamber 14.

The inlet passage of a fluid distribution system has the potential to couple to the acoustic modes of the chamber of the system. This coupling produces oscillations in the fluid flowing through the chamber. These oscillations create the problem of whistle or screech. Thus, according to the present invention, a sufficient number of orifices 24 are formed in each plate 22 to reduce the coupling between the flow of fluid through the inlet passage and the acoustic modes of the chamber. By reducing this coupling, the acoustic modes of the chamber are substantially unexcited by the flow of fluid through the orifices. In addition, the orifices formed in accordance with the present invention do not generate their own acoustic modes, so that the resonance frequency of each of the orifices is substantially unexcited by the flow of fluid therethrough. By "substantially unexcited", it is meant that the flow of fluid through the orifices may produce a weak excitation of the resonance frequency of each of the orifices and the acoustic modes of the chamber. However, this excitation is negligible, particularly with respect to the amount of energy drawn from the flow to establish the intensity of the related tones.

An orifice has a strong tendency to screech or whistle if the ratio of orifice length, L, to orifice diameter, d, is approximately one. It has been found that the tendency to screech or whistle decreases as the ratio of L/d is increased or decreased, and when the ratio is about or below one quarter or about or above four, the tendency to whistle or screech is effectively eliminated. Thus, an orifice does not screech if the ratio between the orifice length, L, and diameter, d, is substantially defined by the relationship:

$$1 > L/d > 4 \qquad (1)$$

The physical basis for the condition expressed in relationship (1) may be explained as follows. When the orifice length-to-diameter ratio is small (i.e., less than one-quarter), the damping produced by the energy removed from the orifice if sound were to be emitted (i.e., the radiation damping) is so large that an instability cannot be established or maintained. When the ratio is in the range between one-quarter and four, the expanded flow after the region of minimum flow cross section within the orifice impinges on and reattaches to the wall of the orifice. This reattachment causes feedback, which is propagated against the flow at the entrance of the orifice, causing the unstable separation of flow to build in resonance. When the orifice length-to-diameter ratio is large (i.e., greater than four), damping and dissipation of energy reduce the feedback.

While the present invention defines a preferred range outside which the L/d ratio should occur, it is possible to design a plate having orifices which fall within this ratio and which do not screech. As the L/d ratio moves from one-quarter or four towards one, the probability of screech or whistle occurring increases slowly. When the ratio approaches one, the probability of screech or whistle occurring increases rapidly. Thus, it may be possible, under certain flow conditions, to have an L/d ratio within the range of relationship (1) as defined above and still not experience screech or whistle.

The relationship defined in (1) above is related to the resonant characteristics of an orifice of length, L, behaving as an organ pipe where end corrections, a, as shown in FIG. 3 are established beyond the physical length of the orifice. The frequency of a screech is given approximately by the equation:

$$f = \frac{C(1 - M)^2}{2(L + 2a)} \text{ Hertz (or } cps) \qquad (2)$$

where:
M is the Mach Number
$M = V/C$
V = Flow Velocity
C = Speed of Sound

While an orifice designed according to relationship (1) above does eliminate the probability of screech or whistle, this probability can be further reduced by ensuring that the orifices screech or whistle out of synchronism, or incoherently. When the orifices screech coherently, the amplitude of the noise of each orifice is additive. However, when the orifices screech incoherently, the intensity of the noise of each orifice is additive. In all cases, the intensity of the noises from coherent addition is greater than or equal to that from incoherent addition.

It has been found that a small irregularity in the orifices makes the screech from the orifices incoherent. A small irregularity in the orifices also changes the frequency of the orifices, as well as the flow pattern through the orifices slightly. For these reasons, plate 22 is radially deformed radially inwardly into inlet passage 16 as shown in FIG. 1. Alternatively, the plate of the present invention may be deformed radially outwardly of the inlet passage to create a small irregularity in the orifices.

Figure 4:
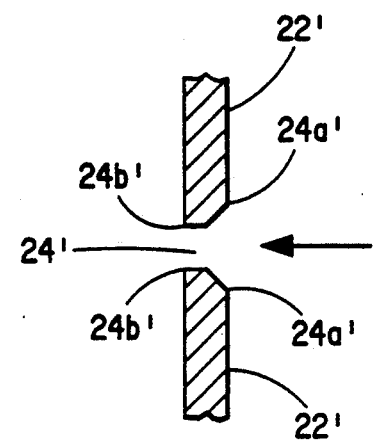
FIG. 4 is a cross-sectional view of a plate with chamfered orifices of another embodiment of the present invention.

By chamfering the orifices, it is also possible to change the flow pattern so that the feedback is essentially eliminated, thereby eliminating the tendency for the orifices to screech or whistle. When the chamfer is formed on the leading edge of the orifice, the point at which the flow reattaches is moved further down the flow path in the direction of flow and reduces the probability of feedback. In the embodiment as shown in FIG. 4, orifices 24' have a leading edge 24a' and a trailing edge 24b' defined by the direction of flow of the fluid, as indicated by the arrow in FIG. 4. Orifices 24' are chamfered, typically 45 degrees, on leading edge 24a' thereof in order to eliminate the tendency for the orifice to screech or whistle.

Figure 5:
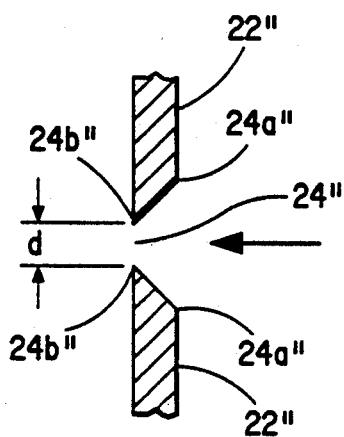
FIG. 5 is a cross-sectional view of a plate with convergingly tapered orifices of yet another embodiment of the present invention.

By tapering the orifices, it is possible to also change the flow pattern so that the probability of flow reattachment is reduced, thereby also eliminating the tendency of the orifices to screech or whistle. The orifice may be formed with either a converging or a diverging taper as defined by the direction of flow. In the embodiment as shown in FIG. 5, orifices 24'' are convergingly tapered at an angle greater than or equal to 30 degrees in the direction flow from leading edge 24a'' to trailing edge 24b''. Alternatively, in the embodiment of FIG. 6, orifices 24''' are divergingly tapered at an angle greater than or equal to 30 degrees in the direction of flow from leading edge 24a''' to trailing edge 24b'''.

Figure 7:
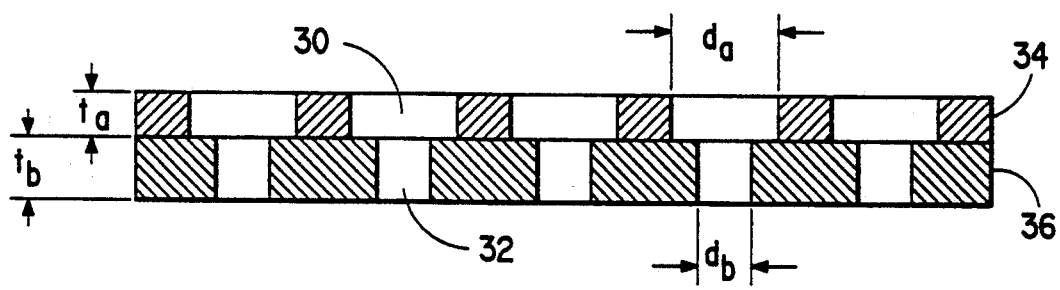
FIG. 7 is a cross-sectional view of a plurality of stacked plates according to yet another embodiment of the present invention.

Further in accordance with the present invention, the means for eliminating narrow band noise comprises a plurality of stacked plates disposed in the inlet passage, wherein the orifices are formed in the plates in a staggered manner. Two such plates are shown in the embodiment of FIG. 7. As can be seen in FIG. 7, an orifice 30 and an orifice 32 are formed in plates 34 and 36, respectively. Orifices 30 and 32 have diameters, $d_a$ and $d_b$, respectively, and plates 34 and 36 have thicknesses, $t_a$ and $t_b$, respectively. As shown in FIG. 7, $d_a$ is larger than $d_b$, and fluid flows in the direction of the larger diameter orifice to the smaller diameter orifice. Orifices 30 and 32 have boundaries which are offset with respect to each other. With the arrangement, it has been found that screech is not produced.

Figure 6:
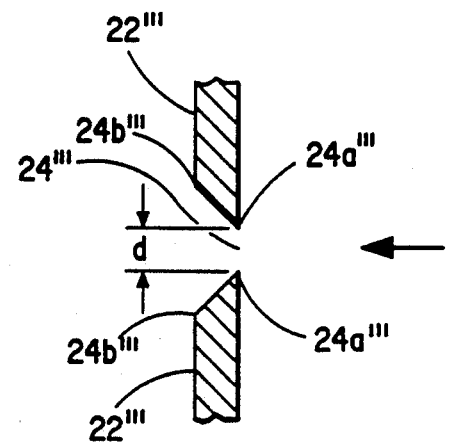
FIG. 6 is a cross-sectional view of a plate with divergingly tapered orifices of still a further embodiment of the present invention.

It is within the scope of the present invention to deform the plate of the present invention radially inwardly or outwardly as well as chamfer the orifices as shown in FIG. 4, or taper the orifices as shown in either FIGS. 5 or 6. In addition, the plural plates of the embodiment of FIG. 7 may be deformed either radially inwardly or outwardly, and the orifices formed therein may be either chamfered or convergingly or divergingly tapered. These multiple modifications further ensure the elimination of screech.

For a plate having orifices formed therein, the separation of orifices should be as small as possible. When the orifices are more than two to three diameters apart, they could screech in synchronism (i.e., coherently). When the orifice separation is smaller than 1.25 times the diameter of the orifices, the screech from the orifices adds incoherently, and the noise level from the orifices is reduced. Thus, it is preferable that the distance between the centerline of each of the orifices is about 1.25 times the diameter of the orifices. Also, it is preferable that the diameter of each of orifices is about four times the thickness of the plate.

It is intended that the fluid distribution system of the present invention encompasses a variety of devices in which fluid flows from an inlet to an outlet. Such devices may include valves, flow impingement devices, dryers and flow restrictors. The preferred embodiment of the present invention is directed to a valve having a sleeve with a plurality of orifices formed therein.

Figure 8:
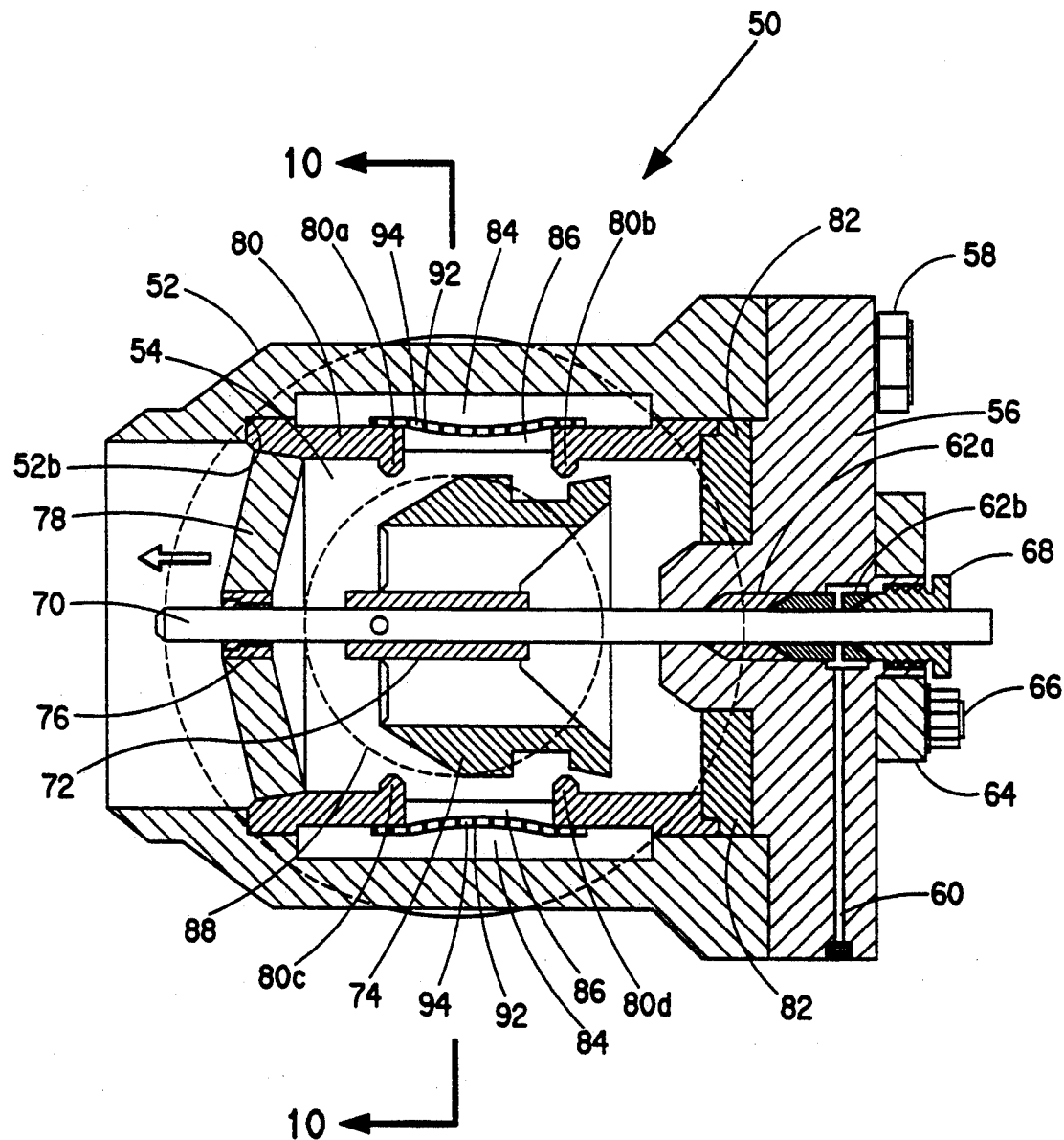
FIG. 8 is a cross-sectional view of a valve of the preferred embodiment of the present invention.

A valve exemplary of the present invention is shown generally at 50 in FIG. 8. Valve 50 comprises a valve body 52. Valve body 52 defines a valve chamber 54 therein. Valve chamber 54 has a plurality of acoustic modes which are excited when the fluid flows through the chamber. Valve chamber 54 is closed off on one axial end by a flange 56 bolted to the end of valve body 52 by a nut 58. A lubricating passage 60 is provided in flange 56 to lubricate a plurality of packing sections 62a, 62b. An end cap 64 is bolted onto flange 56 by a nut 66. An externally threaded screw 68 is provided in an externally threaded section of flange 56 and is screwed down onto packing sections 62a, 62b.

Figure 10:
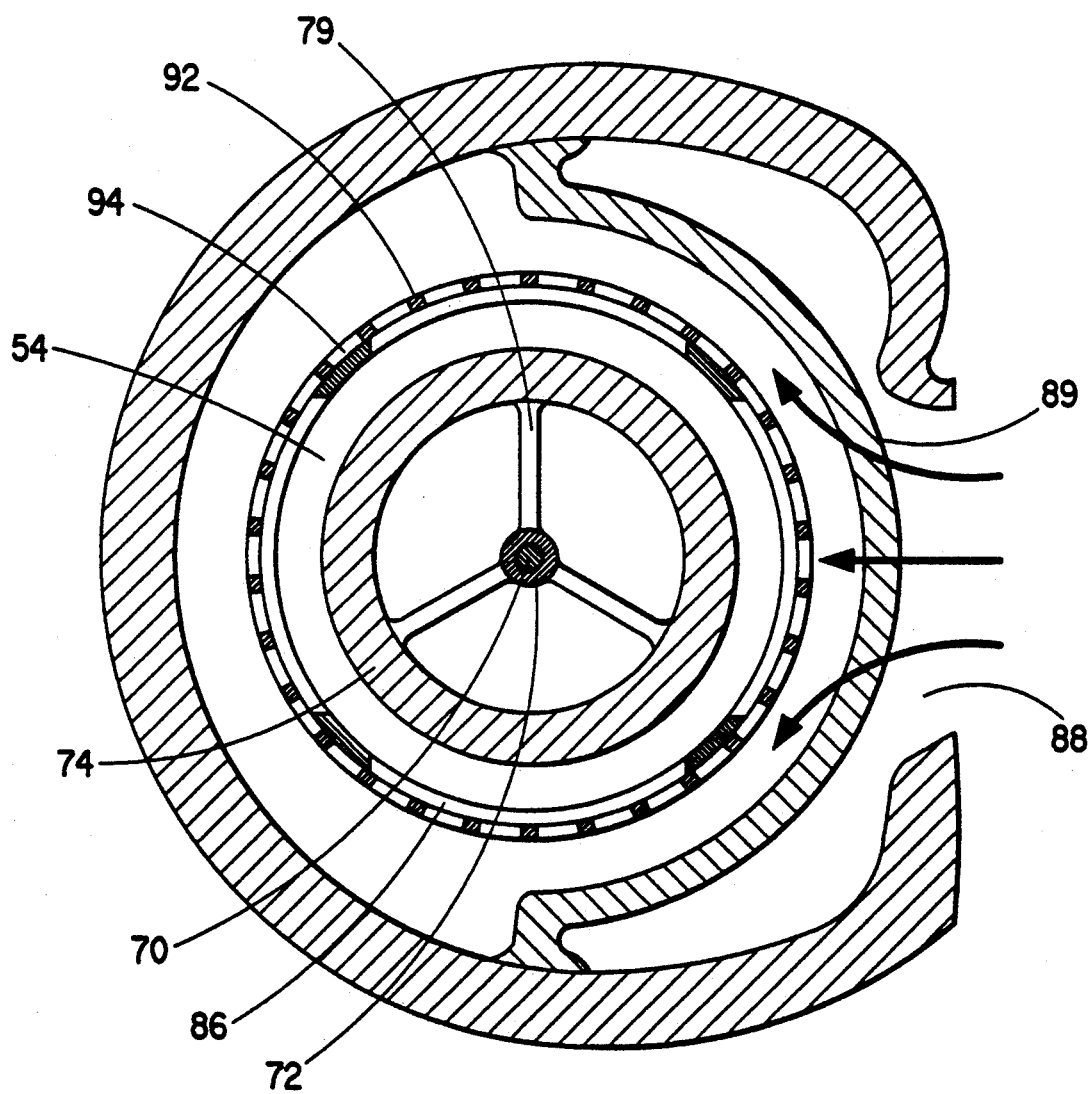
FIG. 10 is a cross-sectional view of the sleeve and the inlet ports taken across lines 10—10 of FIG. 8.

Screw 68 and flange 56 have a threaded central bore that accommodates a valve stem 70 therein for rotation. Valve stem 70 is journaled in flange 56, in a bearing 72 formed in a valve plug 74 and in a bearing 76 formed in a spider section 78. Spider section 78 comprises a plurality of radially spaced vanes, two of which are shown in FIG. 8. The end of valve stem 70 extends into valve chamber 54 and is fixed to valve plug 74. Valve plug 74 is held on valve stem 70 by three support vanes 79 as shown in FIG. 10. Rotation of valve stem 70 moves plug 74 axially relative to valve body 52. A valve seat member 80 guides the axial movement of plug 74. Valve seat member 80 is held in place by an angled section 52b of valve body 52 and by spider section 78 on one axial end of valve chamber 54 and by a ring 82, which fits snugly against flange 56 on the other axial end of the valve chamber. A plurality of valve seats 80a, 80b, 80c and 80d are provided on valve seat member 80.

The valve of the present invention further comprises an inlet passage and an outlet passage disposed in communication with the valve chamber. As shown in FIG. 8, an inlet passage 84 is disposed in communication with valve chamber 54 via a plurality of circumferentially spaced ports 86. Four such ports 86 are shown in FIG. 10. Inlet passages 84 are formed in valve body 52 and are disposed in fluid communication with a radial inlet manifold 88, which is indicated by the circular dashed lines of FIG. 8. A portion of inlet manifold 88 is also shown in FIG. 10, and is separated from inlet ports 86 by a rib 89. Inlet manifold 88 is connected to a fluid flow line (not shown). Fluid flows through inlet manifold 88, through inlet passages 84 and ports 86 into valve chamber 54 and then through a plurality of outlet passages 90 shown in FIG. 9 formed between the radial vanes of spider section 78.

In operation, as plug 74 moves axially to the right as shown in FIG. 8, it unseats against seats 80b and 80d to provide a fluid flow path from inlet passage 84 through valve chamber 54 and to outlet passages 90 around both sets of seats 80a, 80c and 80b, 80d. When plug 74 moves axially to the left as shown in FIG. 8, it seats against seats 80b and 80d to close off the flow of fluid from inlet passage 84. In this position, valve plug 74 does not completely seat against seats 80a and 80c, so that leakage flow may flow therepast. The structure described so far is conventional and well-known to those of ordinary skill in the valve art.

As embodied herein, the valve of the present invention comprises means for eliminating narrow band noise. The means for eliminating narrow band noise comprises a plurality of orifices disposed in the inlet passage and a sleeve surrounding the inlet passage, wherein the orifices are formed in the sleeve. As shown in particular in FIG. 9, a sleeve 92 surrounds inlet passage 84 and has a plurality of orifices 94 formed therein for conducting fluid from inlet passage 84 through ports 86 to chamber 54. Each orifice has a resonance frequency. The resonance frequency of each orifice is substantially equal to the resonance frequency of every other orifice, assuming that the dimensions of each of the orifices are the same. In accordance with the principles discussed above with respect to the fluid distribution system of FIGS. 1-3, a sufficient number of orifices 94 are formed to reduce the coupling between the flow of fluid through the inlet passage and the acoustic modes of the chamber, whereby the acoustic modes of the chamber and the resonance frequency of each of the orifices are substantially unexcited by the flow of fluid through the orifices.

Figure 9:
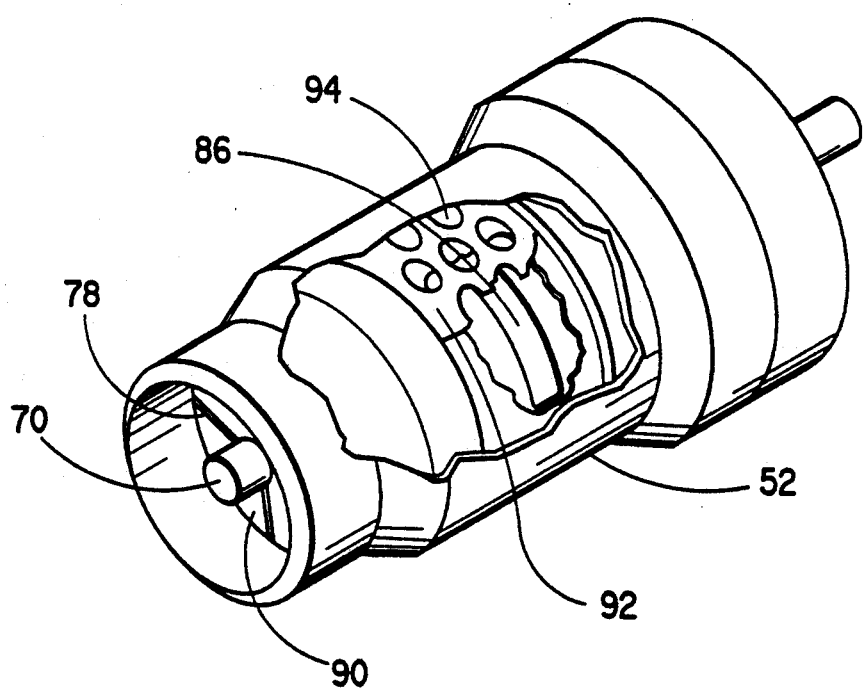
FIG. 9 is a cut-away, perspective view showing the sleeve surrounding the inlet passages of the valve of FIG. 8.

In the embodiment of FIGS. 8-10, each orifice 94 has a length, L', and a diameter, d'. According to the principles developed in the discussion of the embodiment of FIGS. 1-3 as set forth above, the orifices of the embodiment of FIGS. 8-10 is designed with ratio of the orifice length, L', and diameter, d', being substantially defined by the relationship:

$$\frac{1}{2} > L'/d' > 4 \tag{3}$$

to eliminate orifice screech.

Figure 2:
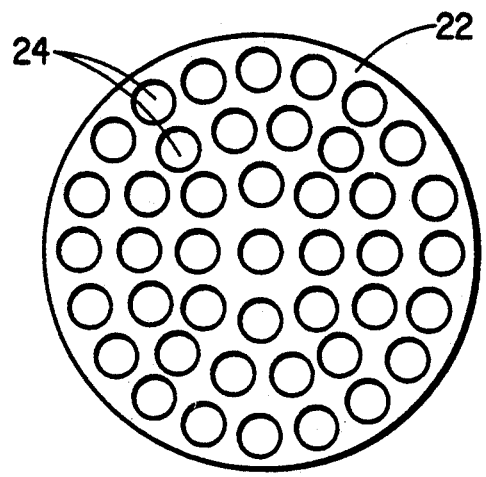
FIG. 2 is a plan view of the plate of FIG. 1.

The sleeve, 92, of the embodiment of FIGS. 8-10 may be deformed radially inwardly into or outwardly from the inlet passage as in the embodiment of FIGS. 1-3. In addition, the orifices of the embodiment of FIGS. 8-10 may chamfered or tapered as discussed above with respect to the embodiments of FIGS. 4-6. Also, stacked plural sleeves may be provided as in the embodiment of FIG. 7. This chamfering or tapering or the installation of stacked plural sleeves may be done in addition to deforming the sleeve radially inwardly into or outwardly from the inlet passage. Also, it is preferable that the orifices of the embodiment of FIGS. 8-10 are designed as in the embodiment of FIGS. 1-3 so that the distance between the centerline of each of the orifices is about 1.25 times the diameter of the orifices, and the diameter of each of the orifices is about four times the thickness of the sleeve.

It is intended that the sleeve of the embodiment of FIGS. 8-10 of the present invention be installed in an existing valve with a minimum amount of disruption. In this case, the orifices are punched into the sleeve before the valve is retrofitted with the sleeve. When retrofitting a valve, if the total area of the inlet port is reduced too much, the operating characteristics (i.e., the ability of the valve to control the flow rate in its design range) of the valve must be changed. Conversely, a sleeve needs a certain amount of structural integrity, which limits the maximum total area of the inlet passage. Thus, it has been found that it is preferable that the total area of the orifices comprises about 30% to 60% of the total area of the inlet passages. Specifically, it is preferable that the total area of the orifices comprises about 50% of the total area of the inlet passages in order to maintain the operating characteristics of the valve and the structural integrity of the sleeve.

EXAMPLE 1

In one example, a sleeve was retrofitted in a control valve as shown substantially in FIGS. 8-10 used in a steam turbine. The valve, without the sleeve, exhibited a whistle or screech of high intensity with a predominant frequency of about 2780 Hertz. Installation of a sleeve having a thickness of approximately 0.060", an orifice diameter of approximately 0.250" and a spacing of about 1.25 orifice diameters reduced the intensity of the screech by approximately 25 dB. The sleeve was formed of 16 gauge 304 stainless steel and was tack-welded to the trim of the valve and the wall of each inlet passage between adjacent ports. The sleeve was also deformed radially into the inlet passage by approximately 0.125". By providing the sleeve in the inlet passage, the total area of the inlet passages was reduced to 58% of the total area of the inlet passages without the sleeve.

EXAMPLE 2

In another example, a sleeve designed with the same design as in Example 1 was retrofitted on a different valve. The valve also had a different noise frequency, this time in the range of 1587-1625 Hertz, depending upon the flow rate. Also, depending on the location where the noise intensity was measured, the noise intensity was in the range of 93-112 dBA. Upon installation of the sleeve, the intensity was reduced about 25 dBA.

Figure 11:
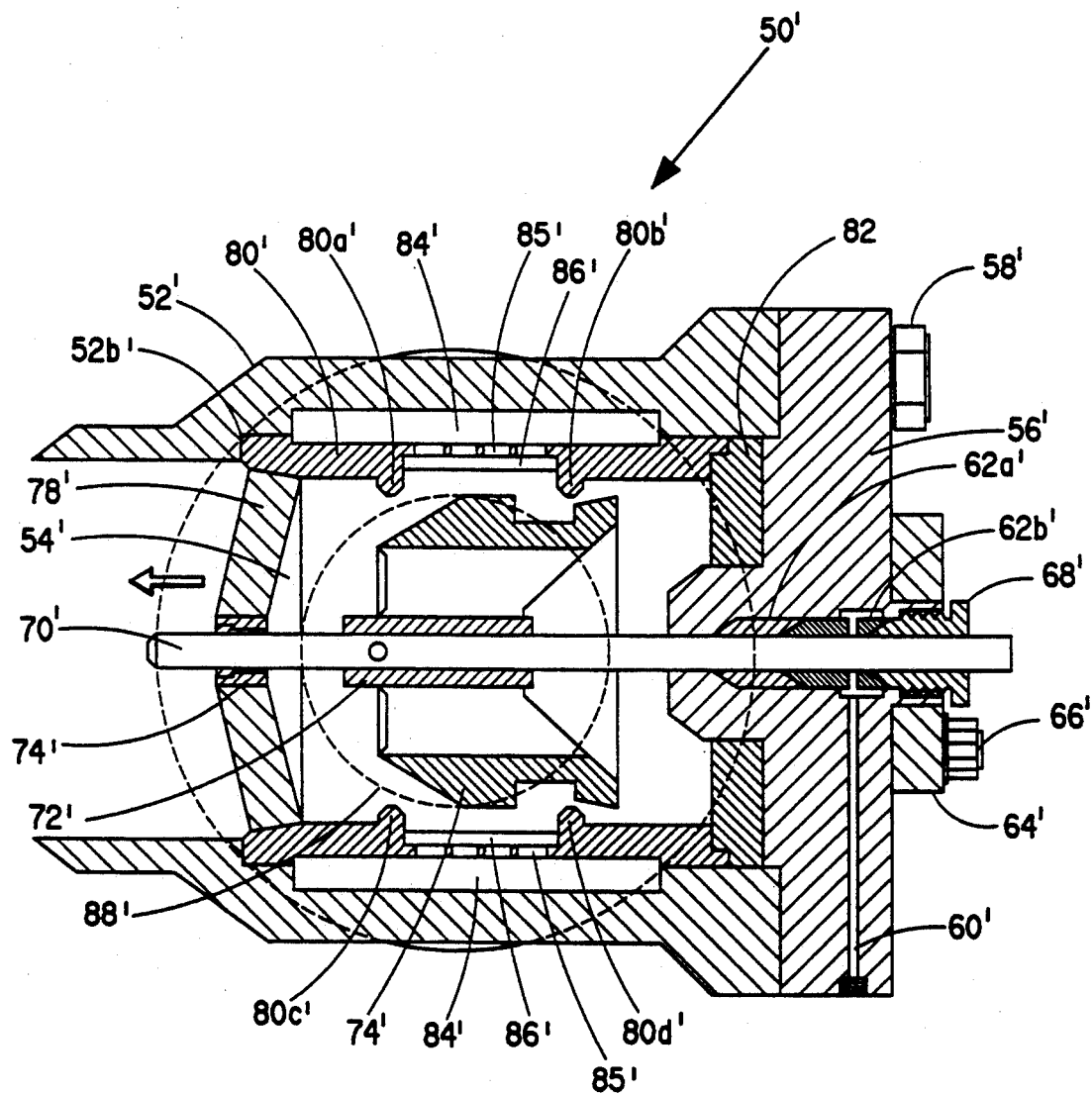
FIG. 11 is a cross-sectional view of a valve of another embodiment of the present invention.
Figure 12:
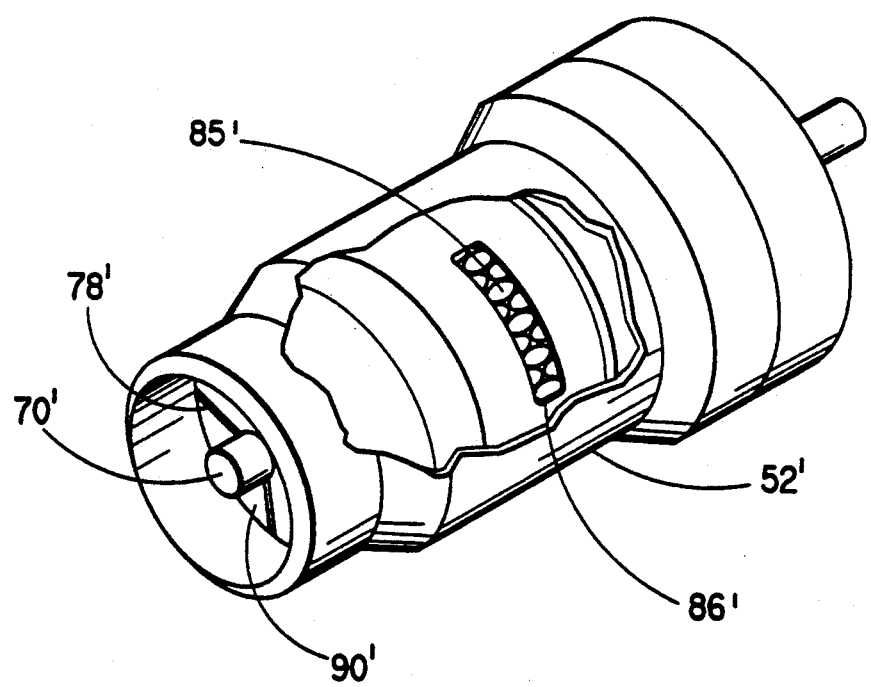
FIG. 12 is a cut-away, perspective view showing the inlet passages of the valve of FIG. 11.

Further in accordance with the present invention there is provided a design for a valve which reduces the noise produced by the valve. A valve according to this embodiment of the present invention is shown in FIGS. 11 and 12, and is substantially similar to the valve shown in the embodiment of FIGS. 8-10. In FIGS. 11 and 12, like reference numerals are used to show like elements in the embodiment of FIGS. 8-10, but are designated with a prime.

A valve designed in accordance with the present invention is shown generally at 50' in FIG. 11. Valve 50' comprises a valve body 52'. Valve body 52' defines a valve chamber 54' therein. Valve chamber 54' has a plurality of acoustic modes. The acoustic modes are excited when the fluid flows through the chamber. Valve chamber 54' is closed off on one axial end by a flange 56' bolted to the end of valve body 52' by a nut 58'. A lubricating passage 60' is provided in flange 56' to lubricate a plurality of packings 62a', 62b'. An end cap 64' is bolted onto flange 56' by a nut 66'. An externally threaded screw 68' is provided in an externally threaded section of flange 56' and is screwed onto packing sections 62a', 62b'.

Screw 68' and flange 56' have a threaded central bore that accommodates a valve stem 70' therein for rotation. Valve stem 70' is journaled in flange 56', in a bearing 72' formed in a valve plug 74' and in a bearing 76' formed in a spider section 78'. Spider section 78' comprises a plurality of radially spaced vanes, three of which are shown in FIG. 12. The end of valve stem 70' extends into valve chamber 54' and is fixed to valve plug 74'. A plurality of support vanes (not shown) are provided on valve plug 74' for holding plug 74' on valve stem 70'. Rotation of valve stem 70' moves plug 74' axially relative to valve body 52'. A valve seat member 80' guides the axial movement of plug 74'. Valve seat member 80' is held in place by an angled section 52b' of valve body 52' and by spider section 78' on one axial end of valve chamber 54' and by a ring 82' which fits snugly against flange 56' on the other axial end of the valve chamber. A plurality of valve seats 80a', 80b', 80c' and 80d' are provided on valve seat member 80'.

The valve of the present invention further comprises means for eliminating narrow band noise. The means for eliminating narrow band noise comprises a plurality of inlet passage openings 85' disposed in valve body 52'. Each of the inlet passages has a resonance frequency. The resonance frequency of each inlet passage is substantially equal to the resonance frequency of every other inlet passage assuming that the dimensions of each of the orifices are the same. Inlet passage openings 85' are disposed in fluid communication with a plurality of inlet passages 84' and a plurality of circumferential ports 86' as shown in FIG. 11. Passages 84' are in turn are disposed in fluid communication with a radial inlet manifold 88', shown by the dashed circular lines in FIG. 11. The inlet manifold is connected to a fluid flow line (not shown). Fluid flows through inlet manifold 88', through passages 84' and through inlet passages openings 85' and ports 86' into valve chamber 54' and then through a plurality of outlet passages 90' as shown in FIG. 12 formed between the radial vanes of spider section 78'. Valve 50' operates substantially as described in the embodiment of FIGS. 8-10 above.

In accordance with the principles discussed above with respect to the fluid distribution system of FIGS. 1-3, a sufficient number of inlet passage openings 85' are formed in valve body 52' in the embodiment of FIGS. 11 and 12 to reduce the coupling between the flow of fluid through the inlet passage and the acoustic modes of the chamber, whereby the acoustic modes of the chamber and the resonance frequency of each of the orifices are substantially unexcited by the flow of fluid through the inlet passage openings.

In the embodiment of FIGS. 11 and 12, each inlet passage opening 85' has a length, L", and a diameter, d". According to the principles developed in the discussion of the embodiment of FIGS. 1-3 as set forth above, the inlet passage openings are designed with ratio of the orifice length, L", and diameter, d", being substantially defined by the relationship:

$$\frac{1}{2} > L''/d'' > 4 \qquad (4)$$

to eliminate screech caused by the inlet passage openings.

Those skilled in the art would recognize that, in order to change the flow pattern, the inlet passage openings of the embodiment of FIGS. 11 and 12 may be chamfered or tapered as in the embodiments of FIGS. 4-6. In this embodiment, however, the chamfering or tapering would be designed into the inlet passage structure, as opposed to the valve of the embodiment of FIGS. 8-10, where the valve is intended to be retrofitted with a sleeve having orifices already punched therein before installation.

Additional advantages and modifications will readily occur to those skilled in the art. The invention in its broader aspects is therefore, not limited to the specific details, representative apparatus and illustrative example shown and described. Accordingly, departures may be made from such details without departing from the spirit or scope of the general inventive concept as defined by the appended claims and their equivalents.

We claim:

1. A fluid distribution system for conducting a fluid therethrough, comprising:
   (a) a housing including at least one chamber, the chamber having a plurality of acoustic modes, the fluid having oscillations carried therein and the acoustic modes being excited when the fluid flows through the chamber;

(b) an inlet passage and an outlet disposed in the housing and in fluid communication with the chamber; and (c) means for eliminating narrow band noise comprising a plurality of orifices disposed in the inlet passage for reducing the coupling between the flow of fluid through the inlet passage and the acoustic modes of the chamber, each of the orifices having a resonance frequency, a length, L, and a diameter, d, and is sized substantially according to the relationship: $\frac{1}{4} > L/d > 4$, whereby the acoustic modes of the chamber and the resonance frequency of each of the orifices are substantially unexcited by the flow of fluid through the orifices.

2. The fluid distribution system as claimed in claim 1, wherein the orifices have a leading edge and a trailing edge defined by the direction of flow of the fluid, and further wherein the orifices are chamfered on the leading edge thereof.

3. The fluid distribution system as claimed in claim 1, wherein the orifices have a leading edge and a trailing edge defined by the direction of flow of the fluid, and further wherein the orifices are convergingly tapered in the direction of flow.

4. The fluid distribution system as claimed in claim 1, wherein the orifices have a leading edge and a trailing edge defined by the direction of flow of the fluid, and further wherein the orifices are divergingly tapered in the direction of flow.

5. The fluid distribution system as claimed in claim 1, wherein the means for eliminating narrow band noise comprises a plate disposed in the inlet passage, the orifices being formed in the plate.

6. The fluid distribution system as claimed in claim 1, wherein the means for eliminating narrow band noise comprises a plurality of stacked plates disposed in the inlet passage, the orifices being formed in each of the plates and being offset with respect to each other.

7. The fluid distribution system as claimed in claim 1, wherein the distance between the centerline of each of the orifices is about 1.25 times the diameter of the orifices.

8. The fluid distribution system as claimed in claim 5, wherein the diameter of each of the orifices is about four times the thickness of the plate.

9. A valve for conducting a fluid therethrough comprising:

(a) a valve body having a valve chamber, the valve chamber having a plurality of acoustic modes, the fluid having oscillations carried therein and the acoustic modes being excited when the fluid flows through the chamber;

(b) at least one inlet passage and one outlet passage disposed in fluid communication with the valve chamber; and (c) means for eliminating narrow band noise comprising a plurality of orifices disposed in the inlet passage for reducing the coupling between the flow of fluid through the inlet passage and the acoustic modes of the valve chamber, each of the orifices having a resonance frequency, a length, L', and a diameter, d', and is sized substantially according to the relationship: $\frac{1}{4} > L'/d' > 4$, whereby the acoustic modes of the chamber and the resonance frequency of each of the orifices are substantially unexcited by the flow of fluid through the orifices.

10. The valve as claimed in claim 9, wherein the means for eliminating narrow band noise comprises a sleeve surrounding the inlet passage, the orifices being formed in the sleeve.

11. The valve as claimed in claim 10, wherein the thickness of the sleeve is about 0.060".

12. The valve as claimed in claim 11, wherein the orifices have a diameter of about $\frac{1}{4}$".

13. The valve as claimed in claim 9, wherein the total area of the orifices comprises about 30% to 60% of the total area of the inlet passage.

14. The valve as claimed in claim 9, wherein the orifices have a leading edge and a trailing edge defined by the direction of flow of the fluid, and further wherein the orifices are chamfered on the leading edge thereof.

15. The valve as claimed in claim 9, wherein the orifices have a leading edge and a trailing edge defined by the direction of flow of the fluid, and further wherein the orifices are tapered in the direction of flow.

16. A valve for conducting a fluid therethrough, comprising:

(a) a valve body having a valve chamber, the valve chamber having a plurality of acoustic modes, the fluid having oscillations therein and the acoustic modes being excited when the fluid flows through the valve chamber;

(b) means for eliminating narrow band noise comprising a plurality of inlet passage openings disposed in the valve body and in fluid communication with the valve chamber for reducing the coupling between the flow of fluid therethrough and the acoustic modes of the valve chamber, each of the inlet passage openings having a resonance frequency, a length, L", and a diameter, d", and is sized substantially according to the relationship: $\frac{1}{4} > L''/d'' > 4$, whereby the acoustic modes of the chamber and the resonance frequency of each of the inlet passage openings are substantially unexcited by the flow of fluid through the inlet passage openings; and (c) at least one outlet passage disposed in fluid communication with the valve chamber.

17. A fluid distribution system for conducting a fluid therethrough, comprising:

(a) a housing including at least one chamber, the chamber having a plurality of acoustic modes, the fluid having oscillations carried therein and the acoustic modes being excited when the fluid flows through the chamber;

(b) an inlet passage and an outlet disposed in the housing and in fluid communication with the chamber; and (c) a plate disposed in the inlet passage for eliminating narrow band noise, the plate being deformed radially inwardly into the inlet passage and comprising a plurality of orifices disposed therein for reducing the coupling between the flow of fluid through the inlet passage and the acoustic modes of the chamber, whereby the acoustic modes of the chamber and the resonance frequency of each of the orifices are substantially unexcited by the flow of fluid through the orifices.

18. A valve for conducting a fluid therethrough, comprising:

(a) a valve body having a valve chamber, the valve chamber having a plurality of acoustic modes, the fluid having oscillations carried therein and the acoustic modes being excited when the fluid flows through the valve chamber;

(b) at least one inlet passage and one outlet passage disposed in fluid communication with the valve chamber; and (c) a sleeve surrounding the inlet passage for eliminating narrow band noise, the sleeve being radially deformed into the inlet passage and comprising a plurality of orifices formed therein for reducing the coupling between the flow of fluid through the inlet passage and the acoustic modes of the valve chamber, whereby the acoustic modes of the chamber and the resonance frequency of each of the orifices are substantially unexcited by the flow of fluid through the orifices.

* * * * *